US007631904B2

(12) United States Patent
Heim et al.

(10) Patent No.: US 7,631,904 B2

(45) Date of Patent: Dec. 15, 2009

(54) RELEASABLE PLUG-IN CONNECTION FOR PIPELINES OR THE LIKE

(75) Inventors: Heiko Heim, Mühlhausen (DE); Egid Macht, München (DE); Karl Redai, Ebern (DE); Helmut Stubenrauch, Ebern (DE)

(73) Assignee: FTE automotive GmbH, Ebern (DE)

(*) Notice: Subject to any disclaimer, the term of this patent is extended or adjusted under 35 U.S.C. 154(b) by 462 days.

(21) Appl. No.: 11/224,396

(22) Filed: Sep. 12, 2005

(65) Prior Publication Data

US 2006/0082146 A1 Apr. 20, 2006

(30) Foreign Application Priority Data

Sep. 14, 2004 (DE) ....................... 10 2004 044 917

(51) Int. Cl.
*F16L 39/00* (2006.01)

(52) U.S. Cl. ......................... 285/321; 285/81; 285/305; 285/319

(58) Field of Classification Search ................... 285/81, 285/82, 86, 87, 308, 319, 321, 305
See application file for complete search history.

(56) References Cited

U.S. PATENT DOCUMENTS

| | | | | |
|---|---|---|---|---|
| 2,873,132 | A * | 2/1959 | Tanner | 277/436 |
| 3,428,340 | A * | 2/1969 | Pelton | 285/95 |
| 3,628,768 | A * | 12/1971 | Hutt | 251/148 |
| 4,423,891 | A * | 1/1984 | Menges | 285/305 |
| 4,524,995 | A * | 6/1985 | Bartholomew | 285/54 |
| 4,725,081 | A | 2/1988 | Bauer | |
| 5,120,085 | A * | 6/1992 | Shin | 285/317 |

(Continued)

FOREIGN PATENT DOCUMENTS

CA 2272016 A1 * 11/1999

(Continued)

OTHER PUBLICATIONS

German Article, Hydraulic Braking Systems; Fittings for Brake Pipes; Male Fittings for Brake Pipes, DIN 74 233 Part 1, Feb. 1991, 3 pages.

(Continued)

*Primary Examiner*—James M Hewitt
*Assistant Examiner*—Jay R Ripley
(74) *Attorney, Agent, or Firm*—Reising Ethington P.C.

(57) ABSTRACT

A pipeline plug-in connection (10) has a receiving part (14), a plug-in part (16) which can be plugged into the receiving part (14), a sealing element (18) for sealing between the receiving part and the plug-in part, and an elastic securing element (20). The plug-in part has a pipe section (50) with an abutment (24) with an expanding diameter section (26) which expands in terms of its external diameter counter to the joining direction, over which expanding diameter section the securing element can be stretched, and an abutment face (28), behind which the securing element can latch. The expanding diameter section ends, with its largest external diameter substantially near or at the abutment face, wherein a flange (54) is formed on the pipe section, the flange forming a sealing face (56) at the end, against which sealing face the sealing element bears in a sealing manner when the plug-in connection is assembled.

13 Claims, 4 Drawing Sheets

U.S. PATENT DOCUMENTS

| | | | | |
|---|---|---|---|---|
| 5,593,188 | A * | 1/1997 | McNaughton et al. | 285/319 |
| 5,909,901 | A | 6/1999 | Zillig et al. | |
| 2003/0052484 | A1 | 3/2003 | Rautureau | |

FOREIGN PATENT DOCUMENTS

| | | | |
|---|---|---|---|
| DE | 90 14 400.7 | U1 | 12/1990 |
| DE | 42 36 323 | A1 | 5/1994 |
| DE | 296 10 434 | U1 | 8/1996 |
| EP | 0 811 798 | A2 | 12/1997 |
| JP | 05196185 | A * | 8/1993 |

OTHER PUBLICATIONS

German Article, Hydraulic Braking Systems; Fittings for Brake Pipes; Union Nuts for Brake Pipes, DIN 74 233 Part 2, Feb. 1991, 2 pages.

German Article, Hydraulic Braking Systems; Brake Pipes; Flares, DIN 74 234, Sep. 1992, 4 pages.

* cited by examiner

RELEASABLE PLUG-IN CONNECTION FOR PIPELINES OR THE LIKE

FIELD OF THE INVENTION

The invention relates to a releasable plug-in connection for pipelines or the like. In particular, the invention relates to a releasable plug-in connection for pipelines or the like in hydraulic clutch actuation and brake systems for motor vehicles.

BACKGROUND OF THE INVENTION

Particularly in hydraulic brake systems for motor vehicles in which the hydraulic connections have to transmit pressures of 70 bar and more, threaded or screw connections using male screws or nuts, as are known in principle from German standards DIN 74233 and 74234, represent the most widely used prior art. During both assembly on the production line and disassembly of these connections, a change has meanwhile taken place from using a spanner to using an electric or pneumatic screwdriver, so that the time required to produce a hydraulically sealed connection could in this way be reduced. However, particularly during assembly of these connections in the overhead position, the problem still exists that the internally and externally threaded sections of the connecting parts may be placed on one another in a manner tilted with respect to one another, before the connection is tightened by means of the screwdriver. The latter switches off when a predefined tightening torque is reached, said predefined tightening torque indicating a hydraulically sealed connection when the threaded connection has been correctly made, but merely feigning a hydraulically sealed connection in the case of a tightening torque which is increased on account of tilting of the connecting parts. The resulting lack of sealing of the connection is often discovered only when the hydraulic system is filled, whereupon cost-intensive remedial measures have to be taken. In the worst case scenario, the lack of sealing is discovered only upon operation of the hydraulic system, resulting in highly dangerous situations.

Besides the conventional threaded or screw connections, releasable plug-in connections for pipelines are also known in the prior art (cf. for example DE 35 31 926 C2 or DE 102 90 508 T1). In this connection, the generic document DE 296 10 434 U1 by the Applicant discloses an end piece of a hydraulic pipe on which a flange is formed, around which a plastic abutment is injection-molded in a form-fitting manner. The abutment has a flat annular face remote from the pipe end, said annular face extending perpendicular to the central axis of the hydraulic pipe. The end piece can be plugged into a connecting hole in an insertion sleeve of a releasable plug-in connection and is secured in the latter by means of a securing element made of round spring steel wire in order to prevent it from being pulled out, wherein the annular face of the abutment can be supported on the securing element in the axial direction of the hydraulic pipe. The abutment here furthermore has a cylindrical section which is delimited by the annular face at its side remote from the pipe end and surrounds the flange of the hydraulic pipe. The cylindrical section, which serves the purpose of guiding the end piece into the connecting hole of the insertion sleeve, in particular with respect to an elastic sealing element which is arranged in the connecting hole, is adjoined in a step-free manner in the direction of the pipe end by a conical section which tapers in the direction of the pipe end from the diameter of the cylindrical section to approximately the external diameter of the hydraulic pipe and serves to elastically expand the securing element radially outwards when the plug-in connection is joined together, before the securing element latches behind the annular face of the abutment at the end of the joining operation, after passing the cylindrical section.

Although such releasable plug-in connections can be assembled overhead more easily compared to the conventional threaded or screw connections and are just as hydraulically resistant to high pressures—as long as they are correctly assembled—and thus are in principle also suitable for brake applications in motor vehicles, they are still subject to reservations in the automotive industry since, during manufacture on the production line, it is not yet possible to reliably ascertain, with reasonable outlay, whether or not the hydraulic connection has been correctly joined.

OBJECT OF THE INVENTION

The object of the invention is accordingly to provide a releasable plug-in connection which, compared to the prior art, is improved with regard to plug safety while having the same good resistance to high pressure.

SUMMARY OF THE INVENTION

According to the invention, in a releasable plug-in connection for pipelines or the like, in particular in hydraulic clutch actuation and brake systems for motor vehicles, comprising a receiving part, a plug-in part which is connected to the pipeline or the like and can be plugged into the receiving part in a joining direction, a sealing element for sealing between the receiving part and the plug-in part, and an elastic securing element which is fitted on the receiving part for securing the plug-in part to the receiving part, wherein the plug-in part has a preferably metallic pipe section on which there is provided an abutment which preferably consists of plastic, said abutment comprising an expanding section which expands continuously in terms of its external diameter counter to the joining direction, over which expanding section the securing element can stretch when the plug-in part is plugged into the receiving part, and an abutment face, behind which the securing element can latch at the end of the plug-in operation and which serves to support the plug-in part on the securing element to prevent unintentional release from the receiving part; the expanding section ends, counter to the joining direction, with its largest external diameter more or less at the abutment face, wherein a flange is formed on the pipe section at the free end of the plug-in part, said flange forming a sealing face at the end of the plug-in part, against which sealing face the sealing element accommodated in the receiving part bears in a sealing manner in the assembled state of the plug-in connection.

In other words, seen in the axial direction of the plug-in part, the point of maximum external diameter of the expanding section of the abutment is adjoined essentially without any transition or essentially directly by the abutment face of the abutment which is remote from the free end of the insertion part and can be engaged behind by the securing element. This means that, when the plug-in connection is joined together, either the plug-in part is acted upon by an axial force on account of the spring force of the securing element, which acts perpendicular to the central axis and acts on the expanding section of the abutment which is oblique with respect to the central axis of the plug-in part, said axial force tending to push the plug-in part back out of the receiving part counter to the joining direction, or else, if the plug-in part has been pushed far enough into the receiving part in the joining direction, the securing element latches behind the abutment face of the abutment. Only the following two possibilities therefore exist: “correctly joined”, that is to say the securing element is latched behind the abutment face in order to hold the plug-in part in a form-fitting manner on the receiving part, or “not correctly joined”, that is to say the plug-in part is pushed back out of the receiving part on account of the spring force of the securing element. Any intermediate positions in which the plug-in part is held in the receiving part merely by friction on account of the spring force of the securing element, without the plug-in connection being correctly joined and thus being able to be subjected to hydraulic loading, are not possible unlike in the generic prior art. This is because, in the generic prior art, an “apparent join” is possible, that is to say an intermediate position in which the stretched securing element bears against the cylindrical guide section of the abutment, as a result of which the end piece is held in the connecting hole of the insertion sleeve only by friction; if this plug-in connection, which is not correctly joined although this can be ascertained only with difficulty from outside, is subjected to hydraulic loading, the end piece is undesirably released from the insertion sleeve. Consequently, the design of the plug-in connection according to the invention therefore ensures in a simple manner that, once the plug-in connection is assembled, any doubt as to whether the plug-in connection has been correctly joined or not is practically ruled out, so that there is high level of plug safety and a reliable plug-in connection is provided.

As a result of the fact that a flange is furthermore formed on the pipe section at the free end of the plug-in part, said flange forming a sealing face at the end of the plug-in part, against which sealing face the sealing element accommodated in the receiving part bears in a sealing manner in the assembled state of the plug-in connection, an axial seal is provided between the plug-in part and the receiving part, said axial seal having a number of advantages over the radial seal used in the aforementioned prior art. On the one hand, a certain degree of compression, that is to say prestressing of the sealing element, advantageously takes place at the end of the joining operation, giving rise to a—nevertheless only small—axial force counter to the joining direction on the sealing face at the end of the plug-in part, said axial force acting when the critical transition between expanding section and abutment face of the abutment is located directly beneath the securing element, and this additionally prevents an unstable “apparent join” at this point. Moreover, the sealing element thus in turn grips the plug-in part against the securing element, as a result of which undesirable noise development (rattling or the like) is prevented at this point. On the other hand, the forces acting on the plug-in part in the release direction, that is to say counter to the joining direction, during operation under hydraulic loading of the plug-in connection, are considerably reduced in comparison to the radial seal in the generic prior art, because the sealing element bears against the end of the plug-in part and thus the annular end face of the latter is not subjected to pressure or is subjected to pressure only over a very small surface portion, this advantageously being associated with taking up a small volume and thus, for example when the plug-in connection is used in a hydraulic clutch actuation system, with negligible stroke travel losses on the piston of the clutch master cylinder.

A design of the plug-in part in which the pipe section is provided with a further flange at a distance from the free end of the plug-in part, around which further flange the abutment is injection-molded in a form-fitting manner, is particularly cost-effective and can be subjected to high loads. However, an embodiment without a flange is also conceivable, in which the abutment is fixed to the pipe section in a force-fitting manner and/or by means of an adhesive join for example. An abutment with a groove on the inner circumference side could also be provided, said abutment having slots and thus being stretchable in order to be mounted on the pipe section, wherein the flange on the pipe section is received in the groove in the mounted state of the abutment, in order to fix the abutment in a form-fitting manner on the pipe section, as is known in principle from DE 35 31 926 C2.

Particularly with regard to low joining forces to be applied during joining of the plug-in connection and a uniform distribution of the joining force (joining force=f (joining travel)), it is advantageous if the plastic of the abutment has a relatively low coefficient of friction and the expanding section of the abutment encloses an angle in the range from 5° to 20°, preferably in the range from 7° to 10°, with the central axis of the plug-in part.

Furthermore, the sealing face at the end of the plug-in part may enclose an angle of less than 90° and of more than or equal to 75° with the central axis of the plug-in part, so that the sealing face tapers essentially conically in the joining direction of the plug-in part, as a result of which the sealing element is advantageously also subject to radial prestress which, particularly when the hydraulic system on which the plug-in connection is used is filled with vacuum pressure, prevents the sealing element from moving out of place, tilting or being pulled out of its annular receiving space under vacuum.

Moreover, the abutment may extend up to the flange of the pipe section at the free end of the plug-in part, and this helps on the one hand to reduce the noise during operation of the plug-in connection since here there is no need for a metal contact between the plug-in part and the receiving part. Furthermore, such an embodiment of the plug-in part gives rise to a certain degree of protection against corrosion on the pipe section. The hydraulic pipes used in the brake hydraulics are in principle protected against corrosion by being provided on the outer circumference with an electroplated layer of zinc which is approximately 12 to 25 μm thick, on which there is an additional plastic coating. This layer structure may however be damaged or chipped off when the flange is formed on the pipe section. If the plastic of the abutment then covers regions of the pipe section which have been damaged in this way, a corrosion problem may not arise there.

It is preferred if the sealing element is an elastomeric “square ring”, comprising an annular body, which has an essentially square cross section, and four spherical sealing beads which, seen in cross section, are formed in a symmetrical arrangement at the corners of the annular body. Compared to an O-ring—which could in principle also be used—such a square ring has the advantage inter alia that it has a better deformation behaviour and thus can reliably compensate the predominantly shape-related and thus small axial shape and position tolerances between plug-in part, receiving part and securing element.

Advantageously, the securing element, seen in plan view, may be essentially U-shaped, comprising two abutment arms which are resiliently connected to one another and extend through slots into the receiving part, where they respectively have a bearing section for the abutment face on the abutment of the plug-in part.

If the abutment arms of the securing element are connected via clip sections to a curved section which extends essentially parallel to the abutment arms and serves to resiliently connect the abutment arms, wherein the plug-in part can be plugged through the curved section into the receiving part, this advantageously ensures at the same time that, in the assembled state of the plug-in connection, the securing element itself is secured on the plug-in part or on the pipeline or the like so as to prevent it from being lost, so that undesirable release of the plug-in connection is ruled out without further measures having to be taken for this purpose.

Furthermore, the abutment may extend beyond the abutment face, counter to the joining direction, with an essentially cylindrical bearing section for the securing element, wherein the external diameter of the bearing section of the abutment is larger than the clear spacing of the bearing sections of the abutment arms in the unloaded state of the securing element. In this embodiment, when the plug-in connection is joined and when the securing element latches behind the abutment face, an audible noise ("click") is produced because the bearing sections of the abutment arms of the securing element strike the bearing section of the abutment, so that the correctly joined status of the plug-in connection is also indicated acoustically. Damage to the pipe section of the plug-in part is ruled out here since the plastic of the bearing section of the abutment covers the pipe section at this point.

Continuing the concept of the invention, a slotted indicator ring may be provided which on the inner circumference side bears against the securing element and can be stretched by the latter, wherein the indicator ring on the outer circumference side protrudes beyond the receiving part when the securing element is stretched by means of the expanding section of the abutment, and is essentially flush with the receiving part when the securing element is latched behind the abutment face of the abutment at the end of the plug-in operation, in order to additionally provide in a simple manner a visible and/or tangible indication of the connection status of the plug-in connection which can be perceived by the assembler or else can even be detected automatically by means of a suitable sensor. Such an indicator ring furthermore has the advantage that it ensures a certain degree of protection against soiling of those abutment faces with which the securing element cooperates in the joined state of the plug-in connection, so that the plug-in connection—for example when replacing or repairing a hydraulic component—can be released without any problems and then joined together again.

In one simple embodiment, the arrangement may be such that the receiving part is provided on the outer circumference side with a radial groove for receiving the indicator ring, said radial groove having a predefined depth, that, starting from the groove bottom of the radial groove, the slots for receiving the abutment arms of the securing element extend into the receiving part, that the indicator ring has a basic body which is essentially C-shaped when seen in plan view, the radial thickness of said basic body essentially corresponding to the depth of the radial groove in the receiving part, and that protrusions are formed on the inner circumference of the basic body of the indicator ring, which protrusions extend into the slots in the receiving part in order to bear against the abutment arms of the securing element.

Finally, the indicator ring may in principle be made of a metallic material. However, with regard to simple shaping and low costs, it is preferred if the indicator ring is injection-molded from plastic.

BRIEF DESCRIPTION OF THE DRAWINGS

The invention will be explained in more detail below on the basis of a preferred example of embodiment and with reference to the appended drawings. In the drawings.

DETAILED DESCRIPTION OF THE PREFERRED EMBODIMENT

Figure 1:
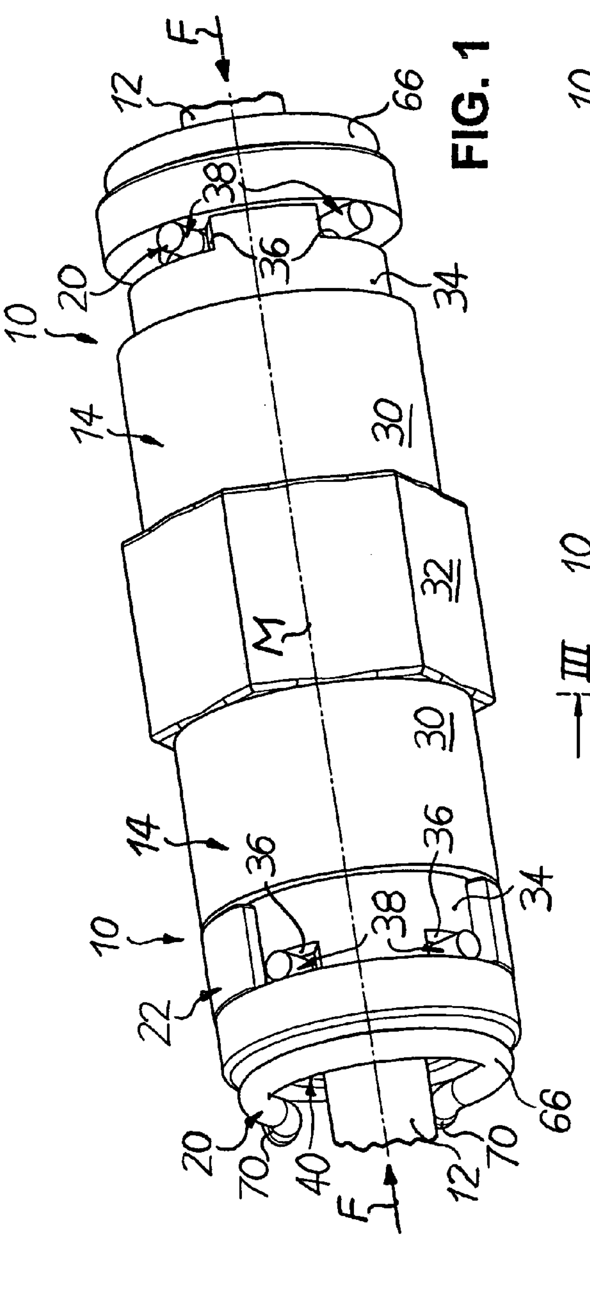
FIG. 1 shows a perspective view, on an enlarged scale compared to the real dimensions and broken off at both sides, of an intermediate piece for connecting two pipelines, on which two plug-in connections according to the invention are formed, said plug-in connections being shown in the joined state.

FIGS. 1 to 4 show, by way of example of a location where a releasable plug-in connection 10 can be used, an intermediate piece which serves to connect two pipelines 12 in a hydraulically sealed manner, for example in a hydraulic clutch actuation or brake system for motor vehicles. The plug-in connection 10 which is shown in the figures and described in more detail below can nevertheless also be used on an intermediate piece for connecting, in a hydraulically sealed manner, a pipeline to a piece of hose or to a terminal of a hydraulic component, such as a master or slave cylinder, a pressure modulator for brake systems or other hydraulic brake or clutch actuation units or components. Hereinbelow, only the plug-in connection 10 which is shown on the left in FIGS. 1, 2 and 4 will be described in detail, since the plug-in connection 10 which is shown on the right in these figures differs only slightly from the plug-in connection 10 shown on the left; nevertheless, the respective differences will also be discussed.

As shown in FIGS. 1 to 4, the plug-in connection 10 has a sleeve-like receiving part 14 into which a plug-in part 16 (shown separately in FIGS. 5 and 6) can be plugged in a joining direction F, said plug-in part being connected to the pipeline 12. The plug-in part 16 may—as in the illustrated example of embodiment—be made in one piece with the pipeline 12. Furthermore, the plug-in connection 10 has, as shown in particular in FIG. 4, a sealing element 18 for sealing between the receiving part 14 and the plug-in part 16, and an elastic securing element 20 which is fitted on the receiving part 14 and is shown separately in FIGS. 7 to 10 and serves to releasably secure the plug-in part 16 to the receiving part 14. A slotted indicator ring 22 may optionally be provided, which indicator ring is shown separately in FIGS. 11 to 14 and provides a visible and/or tangible indication of the connection status of the plug-in connection 10, in a manner to be described in more detail below.

Figures 3, 4, 5, 6:
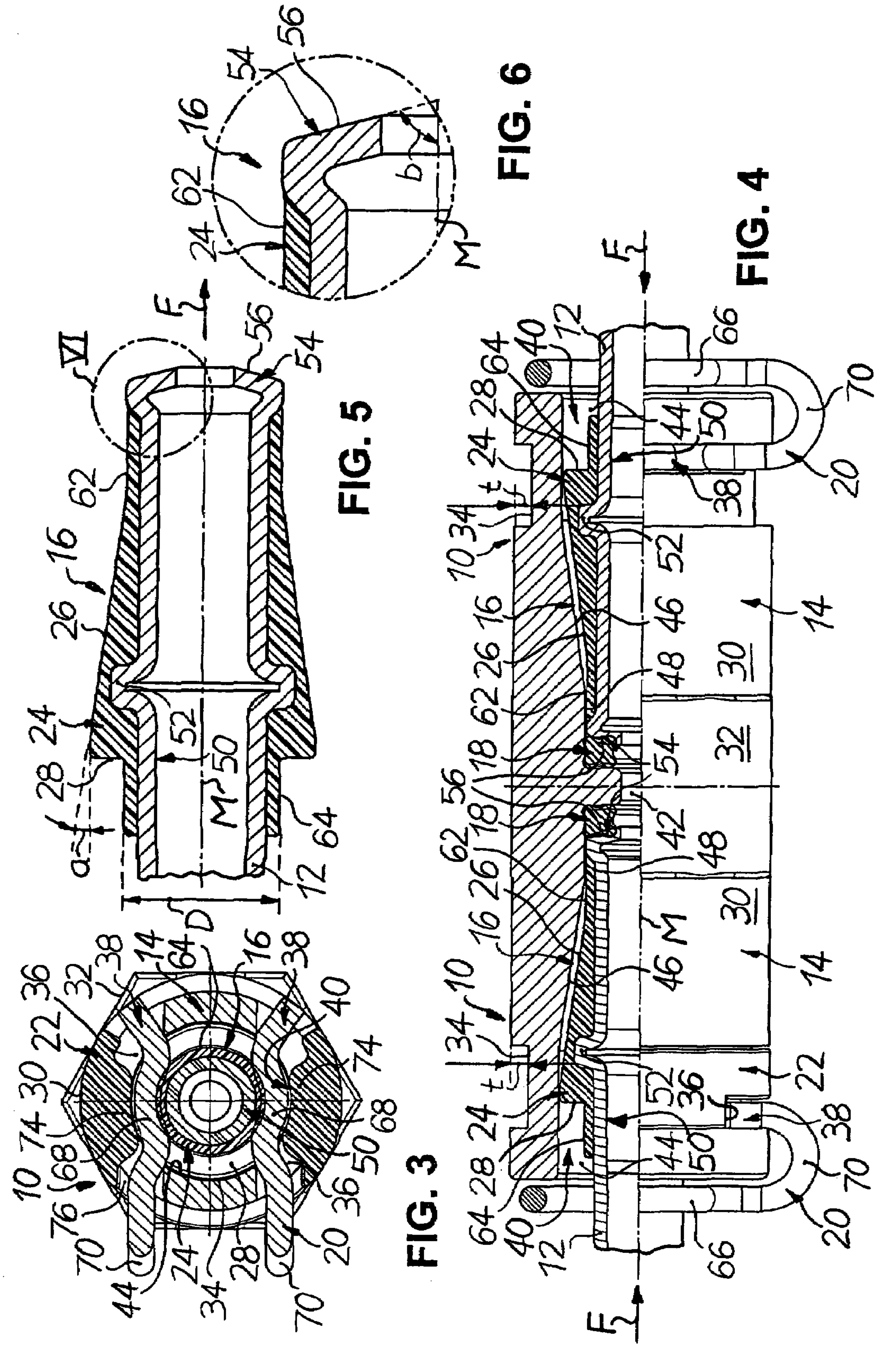
FIG. 3 shows a sectional view of the plug-in connection shown on the left in FIG. 1, along the section line III-III in FIG. 2.
FIG. 4 shows a view, broken off at both sides and broken open above the central axis, of the intermediate piece of FIG. 1 from below in FIG. 2.
FIG. 5 shows a longitudinal section, on an enlarged scale compared to the diagram in FIGS. 1 to 4 and broken off, of a plug-in part of the plug-in connection shown on the left in FIGS. 1, 2 and 4.
FIG. 6 shows an enlarged diagram of detail VI in FIG. 5.

As can clearly be seen from FIG. 5, the plug-in part 16 has an abutment 24 comprising an expanding section 26 which expands continuously in terms of its external diameter counter to the joining direction F, over which expanding section the securing element 20 can stretch when the plug-in part 16 is plugged into the receiving part 14, and an abutment face 28, behind which the securing element 20 can latch at the end of the plug-in operation and which thus serves to support the plug-in part 16 on the securing element 20 to prevent unintentional release from the receiving part 14. It is essential that, as will be described in more detail below, the expanding section 26 ends, counter to the joining direction F, with its largest external diameter more or less at the abutment face 28, so that the abutment face 28 adjoins the expanding section 26 of the abutment 24 essentially without any transition.

“Essentially” here is intended to mean that the expanding section 26 of the abutment 24 need not adjoin the abutment face 28 of the abutment 24 directly. Rather, in order to prevent an acute angle between the expanding section 26 and the abutment face 28, at which breaks in the material could arise, a rounded transition section which is very short in the axial direction may be provided between the expanding section 26 and the abutment face 28, as in the illustrated example of embodiment. In the case for example of a securing element 20 which consists of a round spring steel wire as in the illustrated example of embodiment, the axial length of such a transition section should nevertheless not be greater than half the diameter of the spring steel wire, in order in any case to ensure either that the securing element 20 latches behind the abutment face 28 on the plug-in part 16 at the end of the plug-in operation or, if the plug-in part 16 has not been plugged far enough into the receiving part 14, that the plug-in part 16 is pushed back out of the receiving part 14 again, counter to the joining direction F and beyond the expanding section 26 which is oblique with respect to the central axis M of the plug-in part 16, as a result of the radially acting spring force of the securing element 20, in order to indicate that the connection between the plug-in part 16 and the receiving part 14 has not been correctly made.

Figure 2:
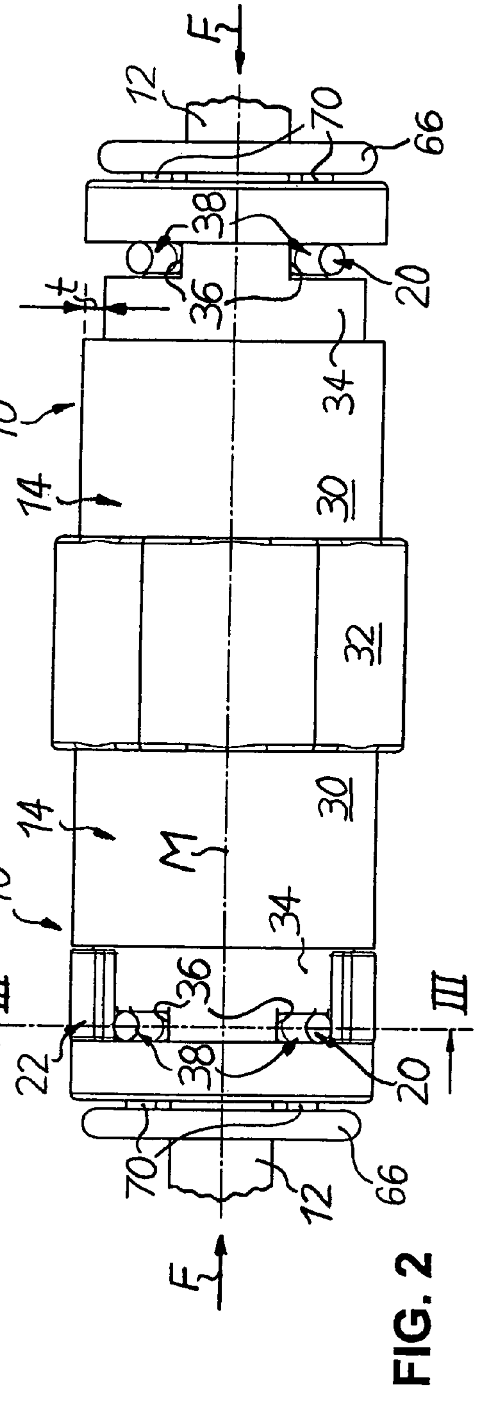
FIG. 2 shows a side view, broken off at both sides, of the intermediate piece of FIG. 1 with the pipelines joined.

As shown in particular in FIGS. 1, 2 and 4, the receiving parts 14 of the intermediate piece, which intermediate piece is preferably made of a metallic material such as steel or an aluminum alloy, each have a cylindrical outer circumferential face 30. The cylindrical outer circumferential faces 30 are connected to one another by a handling section 32 in the form of a keyed surface or the like. Close to the longitudinal ends of the intermediate piece, each cylindrical outer circumferential face 30 is provided with a radial groove 34 of predefined width and depth t, said radial groove serving to receive the indicator ring 22, as shown in FIGS. 1 to 4.

At the outer end of the radial groove 34, that is to say at the left-hand end in the case of the radial groove 34 shown on the left in FIGS. 1, 2 and 4, slots 36 are formed in the latter from diametrically opposite sides of the receiving part 14, which slots run perpendicular to the central axis M. The two slots 36 in each case extend from the groove bottom of the radial groove 34 into the receiving part 14 and in each case serve to receive one of two abutment arms 38 of the securing element 20.

The receiving part 14 furthermore has a connecting hole 40 for receiving the plug-in part 16, which connecting hole extends from the end side into the intermediate piece. As shown in FIG. 4, the connecting holes 40 of the two receiving parts 14 of the intermediate piece are hydraulically connected to one another via a central through-hole 42 in the longitudinal direction of the intermediate piece. The connecting hole 40 has, starting from the end side of the intermediate piece, three hole sections 44, 46, 48, with a first cylindrical hole section 44 which extends in the axial direction more or less up to the inner end of the radial groove 34, a hole section 46 which adjoins the first hole section in a step-free manner and tapers conically in the joining direction F, said hole section 46 serving to centre the plug-in part 16 when the plug-in connection 10 is joined together, and a second cylindrical hole section 48 which serves to receive the sealing element 18 and adjoins the conical hole section 46 in a step-free manner. As can clearly be seen in FIG. 4, the diameter of the second cylindrical hole section 48 is smaller than the diameter of the first cylindrical hole section 44 but larger than the diameter of the through-hole 42, in order to delimit a relatively narrow annular space for receiving the sealing element 18. It should also be mentioned at this point that the internal diameter of the first cylindrical hole section 44 is only slightly larger than the largest external diameter of the conical expanding section 26 of the abutment 24 on the plug-in part 16, whereas the internal diameter of the second cylindrical hole section 48 is only slightly larger than the smallest external diameter of the expanding section 26, wherein the expanding section 26 determines the largest and smallest external diameters of the abutment 24. As a result, the plug-in part 16 is held in the connecting hole 40 of the receiving part 14 with only very little radial play in the joined state of the plug-in connection 10.

Further details of the plug-in part 16 can be seen in FIGS. 5 and 6. Accordingly, the plug-in part 16 firstly has a metallic pipe section 50 which in the illustrated example of embodiment is made in one piece with and of the same material as the pipeline 12. In brake applications in motor vehicles, the latter is usually a double-walled steel pipe which is copper-plated on the inside and outside and is moreover provided on the outer circumference with an electroplated layer of zinc for the purposes of corrosion protection, said layer of zinc being provided with an additional plastic coating. The abutment 24, which consists of a plastic with a relatively low coefficient of friction, for example polyamide 6,6—optionally with a predefined amount of glass fibres, e.g. 35%—is fixed to the pipe section 50. More specifically, the pipe section 50 is provided with a formed flange 52 at a distance from the free end of the plug-in part 16, which flange protrudes radially outwards beyond the external diameter of the rest of the pipe section 50 and has the abutment 24 injection-molded around it in a form-fitting manner, so that the flange 52 is surrounded by the expanding section 26 of the abutment 24.

Before the abutment 24 is injection-molded, a further flange 54 is formed on the pipe section 50 at the free end of the plug-in part 16, which flange radially inwards slightly restricts the free through-flow cross section of the pipe section 50 compared to the rest of the pipe section 50 and radially outwards protrudes somewhat beyond the rest of the pipe section 50. The further flange 54 thus forms a sealing face 56 at the end of the plug-in part 16, the radial length of which sealing face is greater than the annular cross section of the rest of the pipe section 50. In the assembled state of the plug-in connection 10 as shown in FIG. 4, the sealing element 18 which is accommodated in the receiving part 14, or more specifically in the second cylindrical hole section 48 thereof, bears in a sealing manner against the sealing face 56 of the flange 54.

As shown in particular in FIG. 6, the sealing face 56 may enclose an angle b of less than 90° and more than or equal to 75° with the central axis M of the plug-in part 16, so that the sealing face 56 tapers essentially conically in the joining direction F, as a result of which the sealing element 18 is prestressed radially outwards by the sealing face 56 in the assembled state of the plug-in connection 10. However, depending on the respective functional requirements, the sealing face 56 may also extend perpendicular to the central axis M of the plug-in part 16, as shown on the plug-in part 16 shown on the right in FIG. 4.

Figure 18:
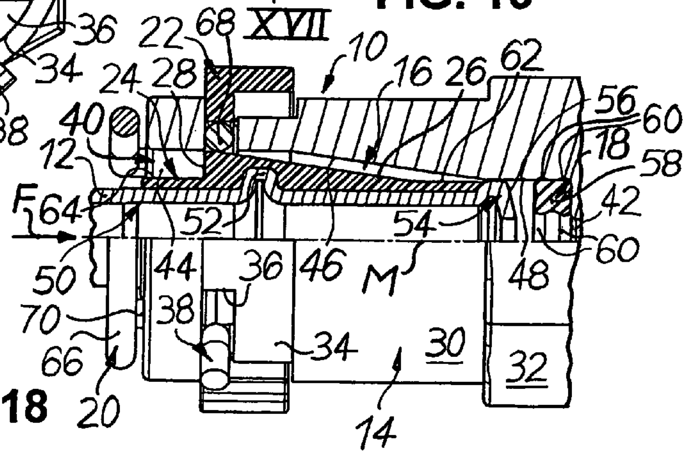
FIG. 18 shows a side view, broken off at both sides, of the intermediate piece of FIG. 1 in the joined position of FIG. 15, which differs from the diagram shown in FIG. 16 in that the intermediate piece is broken open above the central axis.

In the illustrated example of embodiment, the sealing elements 18, which are shown in the non-deformed state in FIGS. 4 and 18 in order to simplify the drawing, are elastomeric square rings which, as shown in FIG. 18, each have an annular body 58, which in this case has an essentially square cross section, and four spherical sealing beads 60 which, seen in cross section, are formed in a symmetrical arrangement at the corners of the annular body 58. It could also be said that the square ring has a square cross section with rounded corners and in each case a central depression or recess between neighbouring rounded corners. However, depending on the respective functional requirements, the square ring could also have a different cross-sectional shape, for example a trapezoidal cross section.

As can furthermore be seen in particular from FIGS. 5 and 6, the abutment 24 extends, with a cylindrical section 62 which adjoins the expanding section 26 in a step-free manner, up to the flange 54 of the pipe section 50 at the free end of the plug-in part 16, so that the pipe section 50 of the plug-in part 16 is enclosed by the abutment 24 up to the flange 54 at the end, in a protective manner.

FIG. 5 furthermore shows the angle of inclination a of the expanding section 26 of the abutment 24, that is to say the angle a which the expanding section 26 encloses with the central axis M of the plug-in part 16. Said angle may lie in the range from 5° to 20°, preferably in the range from 7° to 10°, and must be adapted to the radially acting spring force of the securing element 20. On the one hand, the angle a must not be too steep in order that the joining force necessary to join the plug-in connection 10 is kept within moderate limits. On the other hand, the angle a must also not be selected to be too flat, so that it is ensured that the stretched securing element 20 which bears against the expanding section 26 of the abutment 24 can push the plug-in part 16 out of the receiving part 14 counter to the joining direction F if the plug-in connection 10 has not been joined correctly, in order to indicate the not correctly joined state of the plug-in connection 10.

Finally, it can also be seen in particular from FIG. 5 that the abutment 24 extends, with an essentially cylindrical bearing section 64 for the securing element 20, counter to the joining direction F, beyond the annular abutment face 28 which runs perpendicular to the central axis M of the plug-in part 16, and this will be discussed in more detail below.

Figure 7:
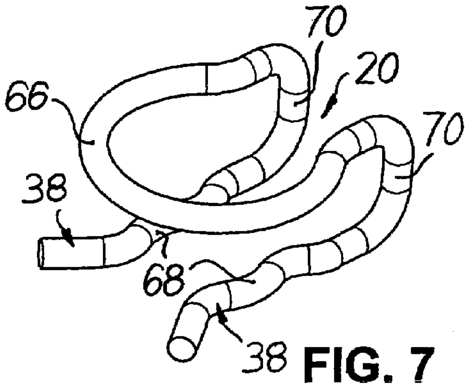
FIG. 7 shows a perspective diagram of a securing element made of spring steel wire which is used in the plug-in connections shown in FIGS. 1 to 4, said securing element being shown in the rest state, that is to say in the unloaded state.
Figure 11:
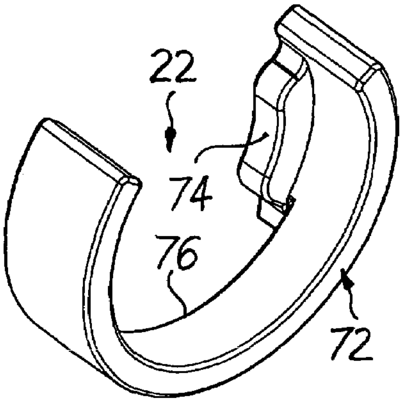
FIG. 11 shows a perspective diagram, on an enlarged scale compared to the diagram in FIGS. 1 to 4, of an indicator ring for indicating the connection status of the plug-in connection, which indicator ring is used in the plug-in connection shown on the left in FIGS. 1, 2 and 4.
Figure 8:
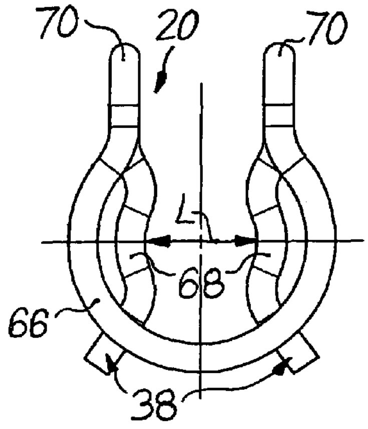
FIG. 8 shows a plan view of the securing element from above in FIG. 7.

The securing element 20 is shown in more detail in FIGS. 7 to 10, namely in its rest position, that is to say in the unloaded state. As shown in FIG. 8 in particular, the securing element 20, seen in plan view, is essentially U-shaped, comprising the two abutment arms 38 which are resiliently connected to one another via a circular curved section 66 and, in the state where the securing element 20 is mounted on the receiving part 14, extend through the slots 36 into the connecting hole 40 of the receiving part 14 (cf. FIGS. 2 and 3). There, the abutment arms 38 each have a bearing section 68 for the abutment face 28 of the abutment 24 on the plug-in part 16. Whereas the abutment arms 38 lie in one plane when seen in the side view of FIG. 9, they have a curved or bent shape when seen in the plan view of FIG. 8, in such a way that they follow the circular curvature of the abutment 24 in the region of the bearing sections 68 so that they bear against the abutment 24 not in a punctiform manner but rather in a linear manner.

Figure 9:
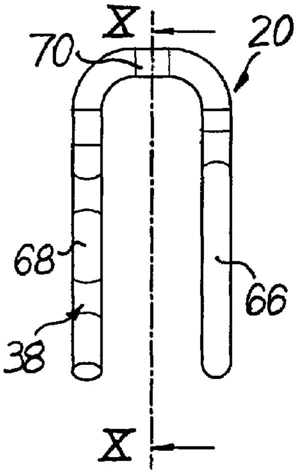
FIG. 9 shows a side view of the securing element from the left in FIG. 8.
Figure 10:
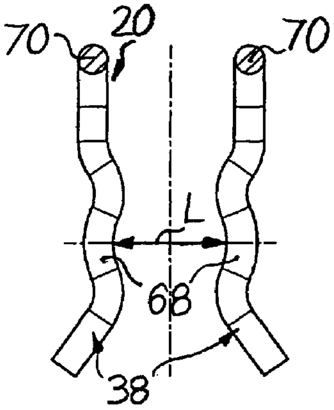
FIG. 10 shows a sectional view of the securing element along the section line X-X in FIG. 9.
Figure 12:
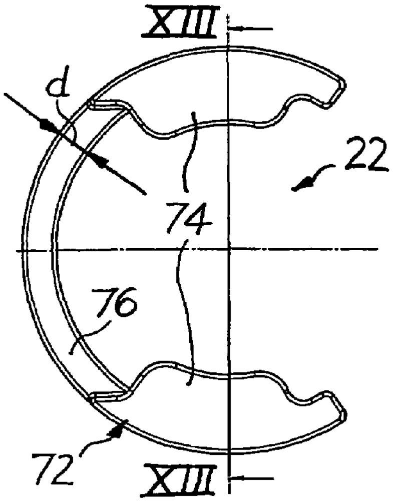
FIG. 12 shows a plan view of the indicator ring of FIG. 11.
Figure 13:
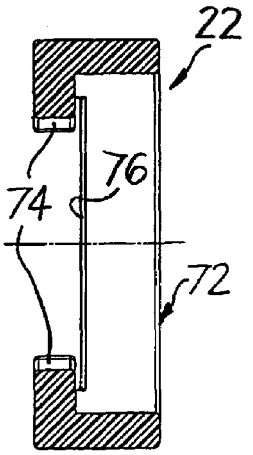
FIG. 13 shows a sectional view of the indicator ring of FIG. 11 along the section line XIII-XIII in FIG. 12.
Figure 14:
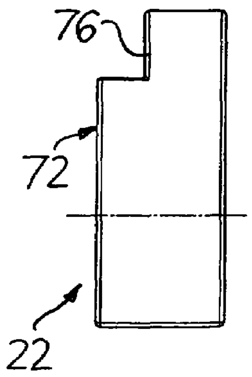
FIG. 14 shows a view of the indicator ring of FIG. 11 from above in FIG. 12, which has been rotated by 90° in the clockwise direction in the plane of the drawing.
Figure 15:
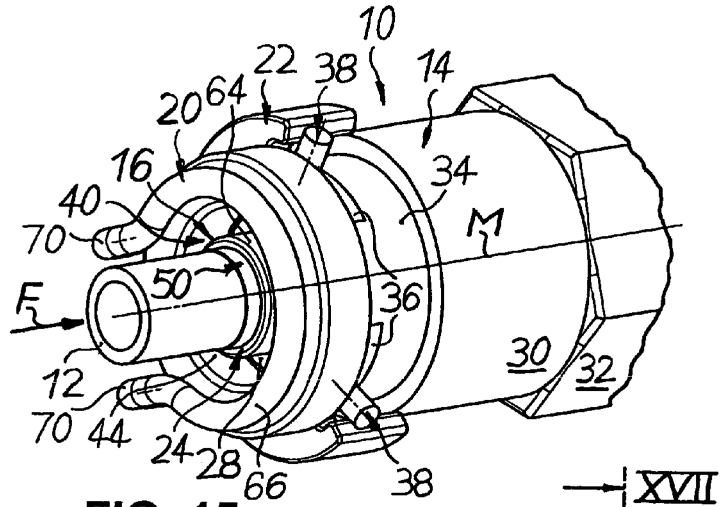
FIG. 15 shows a broken-off, perspective diagram of the intermediate piece of FIG. 1 in the region of the plug-in connection shown on the left in FIGS. 1, 2 and 4, said plug-in connection not yet being completely joined so that the indicator ring protrudes considerably outwards in the radial direction beyond the intermediate piece.
Figure 16:
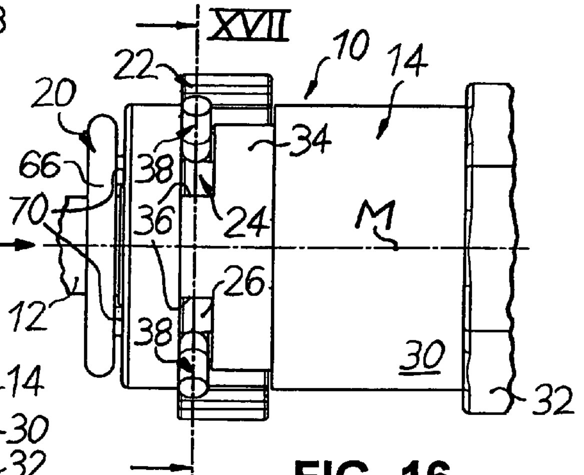
FIG. 16 shows a side view, broken off at both sides, of the intermediate piece of FIG. 1 in the joined position of FIG. 15.

Furthermore, it can clearly be seen in particular from FIGS. 7 to 9 that the abutment arms 38 of the securing element 20 are connected via clip sections 70 to the curved section 66, in such a way that the curved section 66 extends essentially parallel to the abutment arms 38. As a result of this configuration, as shown in FIGS. 1, 2, 4, 15, 16 and 18, the curved section 66 is arranged in front of the opening of the connecting hole 40 in the receiving part 14 when the abutment arms 38 are positioned in the slots 36 in the receiving part 14. The plug-in part 16 can thus be plugged into the receiving part 14 through the curved section 66 of the securing element 20, as a result of which the securing element 20 itself is secured on the plug-in part 16 or on the pipeline 12 or the like, so as to prevent it from being lost, in the assembled state of the plug-in connection 10.

Figure 17:
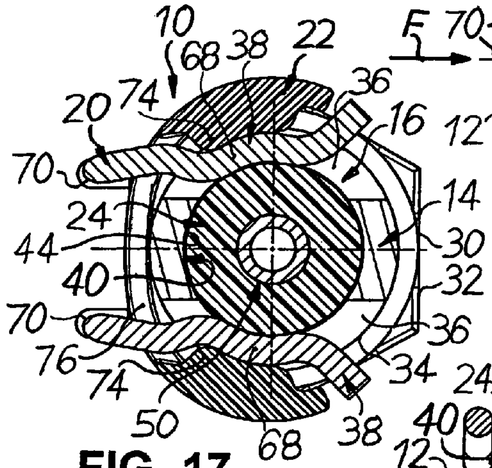
FIG. 17 shows a sectional view of the plug-in connection of FIG. 15 along the section line XVII-XVII of FIG. 16.

As shown in particular in FIG. 17, the clip sections 70 of the securing element 20 act as torsion springs, the spring force of which is superposed on the spring force of the curved section 66, which acts as a spiral spring, and on the spring forces of the abutment arms 38 of the securing element 20, which also act as spiral springs, in order to generate radially inwardly oriented reaction forces when the securing element 20 is stretched or spread open at the bearing sections 68 of the abutment arms 38.

With regard to the securing element 20, it should finally also be pointed out that the clear distance L (shown in FIGS. 8 and 10) of the bearing sections 68 of the abutment arms 38 in the unloaded state of the securing element 20 is smaller than the external diameter D (shown in FIG. 5) of the cylindrical bearing section 64 of the abutment 24. As a result of this configuration, the abutment arms 38 of the securing element 20 perceptibly strike the bearing section 64 of the abutment 24 when the securing element 20 latches behind the abutment face 28 of the abutment 24 at the end of the joining operation, in order to also indicate acoustically that the plug-in part 16 and the receiving part 14 have been corrected connected. This matching of the dimensions L and D can be clearly seen in FIG. 3, in which the securing element 20 is shown in the unloaded state, which is why the edges of securing element 20 and abutment 24 intersect one another here. FIG. 3 also shows that the radial spacing of the slots 36 in the receiving part 14 is matched to the clear spacing of the abutment arms 38 of the securing element 20, namely in such a way that the securing element 20 is held on the receiving part 14 even when the plug-in part 16 is not joined, in order to facilitate handling of the plug-in connection 10.

FIGS. 11 to 14 show further details regarding the slotted indicator ring 22, which is preferably injection-molded from a plastic. Accordingly, seen in the plan view of FIG. 12, the indicator ring 22 has an essentially C-shaped basic body 72, the radial thickness d of which essentially corresponds to the depth t of the radial groove 34 in the receiving part 14 (cf. FIGS. 2 and 4). On the inner circumference of the basic body 72, the indicator ring 22 has, on essentially diametrically opposed sides, radially inwardly oriented protrusions 74 which are formed in such a way that they pass into the slots 36 in the receiving part 14. More specifically, as shown in particular in FIG. 3, the protrusions 74 of the indicator ring 22 extend into the slots 36 in the receiving part 14 when said indicator ring is mounted on the receiving part 14, in order to bear against the outside of the abutment arms 38 of the securing element 20, more specifically against the bearing sections 68 thereof. Here, the basic body 72 is provided with a cut-out 76 between the protrusions 74, so as not to collide with the clip sections 70 of the securing element 20.

As a result, the indicator ring 22, which on the inner circumference side bears against the securing element 20 in the mounted state, can be stretched by the securing element 20 when the plug-in connection 10 is joined, wherein the indicator ring 22, when absorbing the torque as shown in FIGS. 15 to 18, protrudes on the outer circumference side beyond the receiving part 14, more specifically beyond the outer circumferential face 30 thereof, when the securing element 20 is stretched by means of the expanding section 26 of the abutment 24 (not yet correctly joined), or, as shown in FIGS. 1 to 4, is essentially flush with the outer circumferential face 30 of the receiving part 14 when the securing element 20 is latched behind the abutment face 28 of the abutment 24 on the plug-in part 16 at the end of the plug-in operation (correctly joined), in order to provide a further visible and/or tangible indication of the connection status of the plug-in connection 10.

It must furthermore be mentioned that disassembly or release of the plug-in connection 10 is possible only by means of a special tool (not shown here), as disclosed for example in U.S. Pat. No. 5,909,901. Such a tool may in the present case have two protrusions which can be guided from the end side of the receiving part 14 into the first hole section 44 of the connecting hole 40, and namely, seen in the radial direction, between the inner circumferential face of the receiving part 14 and the outer circumferential face of the bearing section 64 of the abutment 24 on the plug-in part 16 and, seen in the circumferential direction, between the abutment arms 38 of the securing element 20. Rotation of this tool out of this starting position by 90° about the central axis M gives rise to a radial spreading-open of the securing element 20, in such a way that the plug-in part 16 can be pulled out of the receiving part 14 together with the tool.

It can be seen from the above description that the correctly or incorrectly joined status of the plug-in connection 10 is indicated optically, haptically and/or tangibly and acoustically, wherein a correctly joined plug-in connection exists (i) when the plug-in part 16 is not pushed out of the receiving part 14 by the securing element 20 (optical and haptical indication), (ii) when the indicator ring 22 does not protrude beyond the outer circumferential face 30 of the receiving part 14 (optical and haptical indication), and (iii) when the abutment arms 38 of the securing element 20 strike the bearing section 64 of the abutment 24 with a perceptible noise ("click") when said securing element latches behind the abutment face 28 on the receiving part 14 (acoustic indication). It is obvious to the person skilled in the art that the measures described for this can also be used independently of one another, depending on the respective functional requirements. As a result, the plug-in connection 10 described here is highly suitable in particular for installation locations which are difficult to access, which may even be inaccessible to electrical or pneumatic screwdrivers, or which are hidden, not visible or the like.

There is disclosed a plug-in connection for pipelines, comprising a receiving part, a plug-in part which can be reliably plugged into the receiving part, a sealing element for sealing between the receiving part and the plug-in part, and an elastic securing element for securing the plug-in part to the receiving part, wherein the plug-in part has a pipe section on which there is provided an abutment comprising an expanding section which expands in terms of its external diameter counter to the joining direction, over which expanding section the securing element can stretch, and an abutment face, behind which the securing element can latch and which supports the plug-in part on the securing element to prevent unintentional release. According to the invention, the expanding section ends, counter to the joining direction, with its largest external diameter more or less at the abutment face, wherein a flange is formed on the pipe section, said flange forming a sealing face at the end, against which sealing face the sealing element bears in a sealing manner when the plug-in connection is assembled. As a result, a reliable plug-in connection is provided which is improved in comparison to the prior art, in particular with regard to plug safety.

We claim:

1. A releasable plug-in connection for a pipeline, the releasable plug-in connection comprising:

a receiving part;

a plug-in part which is connected to the pipeline and can be plugged into the receiving part in a joining direction, the plug-in part having a terminal end and a central axis, a sealing element interposed between the receiving part and the plug-in part;

an elastic securing element which is fitted on the receiving part for securing the plug-in part to the receiving part;

wherein the plug-in part has a pipe section on which there is provided an abutment, said abutment having an expanding external diameter section which expands continuously away from the terminal end and essentially to an opposite facing abutment face, the extent of the expanding external diameter section being from a point intermediate the terminal end and opposite facing abutment face to essentially the opposite facing abutment face with a largest diameter section essentially at the abutment face and the extent of the expanding external diameter section covering a substantial portion of the distance from the terminal end to the opposite facing abutment face;

wherein the elastic securing element can resiliently stretch over said expanding diameter section when the plug-in part is plugged into the receiving part;

wherein said abutment face, behind which the elastic securing element resiliently biases back toward an unflexed position and can latch at the end of the plug-in operation serves to support the plug-in part on the securing element to prevent unintentional release from the receiving part;

wherein a flange is formed on the pipe section at the terminal end of the plug-in part, said flange forming a sealing end face against which the sealing element bears in a sealing manner in the assembled state of the plug-in connection;

wherein the receiving part has an axial facing shoulder that abuts said sealing element when said sealing element is interposed between said sealing end face of said plug-in part and said axial facing shoulder of said receiving part; and wherein the abutment extends up to the flange of the pipe section at the terminal end of the plug-in part.

2. The releasable plug-in connection according to claim 1, wherein the pipe section is provided with a second flange at a distance from the terminal end of the plug-in part, around which said second flange the abutment is injection-molded in a form-fitting manner.

3. The releasable plug-in connection according to claim 1, wherein the abutment is made of plastic and has a relatively low coefficient of friction and the expanding external diameter section of the abutment encloses an angle (a) in the range from 5° to 20° with the central axis of the plug-in part.

4. The releasable plug-in connection according to claim 1, wherein the sealing end face encloses an angle (b) of less than 90° and of at least 75° with the central axis of the plug-in part, so that the sealing end face tapers substantially conically in the joining direction.

5. The releasable plug-in connection according to claim 1, wherein the securing element is substantially U-shaped, comprising two abutment arms which are resiliently connected to one another and extend through slots into the receiving part, where they respectively have a bearing section for the abutment face on the abutment of the plug-in part.

6. The releasable plug-in connection according to claim 5, wherein the abutment anus of the securing element are connected via clip sections to a curved section which extends substantially parallel to the abutment arms and serves to resiliently connect the abutment arms, wherein the plug-in part can be plugged through the curved section into the receiving part so that, in the assembled state of the plug-in connection, the securing element itself is secured on one of the plug-in part and the pipeline so as to prevent the securing element from being lost.

7. The releasable plug-in connection according to claim 5, wherein the abutment extends beyond the abutment face with a substantially cylindrical bearing section for the securing element, wherein an external diameter of the bearing section of the abutment is larger than a clear spacing of the bearing sections of the abutment arms in the unloaded state of the securing element.

8. The releasable plug-in connection according to claim 1, comprising a slotted indicator ring which on an inner circumference side bears against the securing element and can be stretched by the latter, wherein the indicator ring on an outer circumference side protrudes beyond the receiving part when the securing element is stretched by means of the expanding external diameter section of the abutment when the plug-in part is plugged into the receiving part, and is substantially flush with the receiving part when the securing element is latched behind the abutment face of the abutment at the end of the plug-in operation, in order to provide one of a visible indication and tangible indication of the connection status of the plug-in connection.

9. The releasable plug-in connection according to claim 8, wherein the indicator ring is injection-molded from plastic.

10. The releasable plug-in connection according to claim 1, wherein the pipe section is metallic.

11. The releasable plug-in connection according to claim 1, wherein the abutment is made of plastic and has a relatively low coefficient of friction and the expanding external diameter section of the abutment encloses an angle (a) in the range from 7° to 10° with the central axis of the plug-in part.

12. A releasable plug-in connection for pipelines, the releasable plug-in connection comprising:

a receiving part;

a plug-in part which is connected to the pipeline and can be plugged into the receiving part in a joining direction, the plug-in part having a free axial end and a central axis;

a sealing element interposed between the receiving part and the plug-in part;

an elastic securing element which is fitted on the receiving part for securing the plug-in part to the receiving part;

wherein the plug-in part has a pipe section on which there is provided an abutment, said abutment having an expanding external diameter section which expands continuously away from the free axial end and substantially to an opposite facing abutment face;

wherein the securing element can resiliently stretch over said expanding diameter section when the plug-in part is plugged into the receiving part;

wherein said abutment face, behind which the elastic securing element resiliently biases back toward an unflexed position and can latch at the end of the plug-in operation, serves to support the plug-in part on the securing element to prevent unintentional release from the receiving part;

wherein a flange is formed on the pipe section at the free axial end of the plug-in part, said flange forming a sealing end face, against which sealing end face the sealing element bears in a sealing manner in the assembled state of the plug-in connection;

a slotted indicator ring which on an inner circumference side bears against the securing element and can be stretched by the latter, wherein the indicator ring on an outer circumference side protrudes beyond the receiving part when the securing element is stretched by means of the expanding section of the abutment when the plug-in part is plugged into the receiving part, and is substantially flush with the receiving part when the securing element is latched behind the abutment face of the abutment at the end of the plug-in operation, in order to provide one of a visible indication and tangible indication of the connection status of the plug-in connection;

wherein the securing element comprises two abutment arms which are resiliently connected to one another and extend through slots into the receiving part;

wherein the receiving part is provided on an outer circumference side with a radial groove that receives the indicator ring, said radial groove having a predefined depth, and a groove bottom;

wherein, starting from the groove bottom of the radial groove, the slots for receiving the abutment arms of the securing element extend into the receiving part;

wherein the indicator ring has a basic body which is substantially C-shaped, said basic body having a radial thickness substantially corresponding to the depth of the radial groove in the receiving part; and wherein protrusions are formed on an inner circumference of the basic body of the indicator ring, which protrusions extend into the slots in the receiving part in order to bear against the abutment arms of the securing element.

13. A releasable plug-in connection for a pipeline, the releasable plug-in connection comprising:

a receiving part;

a plug-in part which is connected to the pipeline and can be plugged into the receiving part in a joining direction, the plug-in part having a terminal end and a central axis;

a sealing element interposed between the receiving part and the plug-in part;

an elastic securing element which is fitted on the receiving part for securing the plug-in part to the receiving part;

wherein the plug-in part has a pipe section on which there is provided an abutment, said abutment having an expanding external diameter section which expands continuously away from the terminal end and essentially to an opposite facing abutment face, the extent of the expanding external diameter section being from a point intermediate the terminal end and opposite facing abutment face to essentially the opposite facing abutment face with a largest diameter section essentially at the abutment face and the extent of the expanding external diameter section covering a substantial portion of the distance from the terminal end to the opposite facing abutment face;

wherein the elastic securing element can resiliently stretch over said expanding diameter section when the plug-in part is plugged into the receiving part;

wherein said abutment face, behind which the elastic securing element resiliently biases back toward an unflexed position and can latch at the end of the plug-in operation, serves to support the plug-in part on the securing element to prevent unintentional release from the receiving part;

wherein a flange is formed on the pipe section at the terminal end of the plug-in part, said flange forming a sealing end face against which the sealing element bears in a sealing manner in the assembled state of the plug-in connection;

wherein the receiving part has an axial facing shoulder that abuts said sealing element when said sealing element is interposed between said sealing end face of said plug-in part and said axial facing shoulder of said receiving part; and wherein the sealing element is an elastomeric square ring, comprising an annular body, which has a substantially square cross section, and four spherical sealing beads which, seen in cross section, are formed in a symmetrical arrangement at the corners of the annular body.

* * * * *

UNITED STATES PATENT AND TRADEMARK OFFICE

CERTIFICATE OF CORRECTION

PATENT NO. : 7,631,904 B2
APPLICATION NO. : 11/224396
DATED : December 15, 2009
INVENTOR(S) : Heiko Heim et al.

It is certified that error appears in the above-identified patent and that said Letters Patent is hereby corrected as shown below:

Claim 6, column 13, line 30 - After “abutment”, delete “anus”; insert --arms--

Signed and Sealed this

Thirtieth Day of March, 2010

David J. Kappos
*Director of the United States Patent and Trademark Office*

UNITED STATES PATENT AND TRADEMARK OFFICE

CERTIFICATE OF CORRECTION

PATENT NO. : 7,631,904 B2
APPLICATION NO. : 11/224396
DATED : December 15, 2009
INVENTOR(S) : Heim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 688 days.

Signed and Sealed this

Second Day of November, 2010

David J. Kappos
*Director of the United States Patent and Trademark Office*